UNITED STATES PATENT OFFICE 2,692,256

ESTERS OF VINYLOXYALKOXY COMPOUNDS AND UNSATURATED CARBOXYLIC ACIDS AND POLYMERS THEREOF

La Verne N. Bauer, Philadelphia, and Harry T. Neher, Bristol, Pa., assignors to Rohm & Haas Company, Philadelphia, Pa., a corporation of Delaware No Drawing. Application March 9, 1951,
Serial No. 214,841

21 Claims. (Cl. 260—86.1)

This invention relates to esters of unsaturated carboxylic acids and monohydric alcohols having a vinyloxy substituent. These esters are defined by the formula $$CH_2=CHO(AO)_mCOR$$

wherein R is an acyclically unsaturated hydrocarbon residue of at least two carbon atoms, A is an alkylene group,  where $n$ is an integer having a value from two to fourteen or more, or a vinyl substituted alkylene group, or a phenyl substituted alkylene group, and $m$ is an integer, usually having a value of one to six and preferably of one to three. This invention also deals with polymers of these esters and with copolymers and heteropolymers based on these esters.

The esters of this invention form polymers under the influence of both acidic catalysts and free radical-type catalysts. Under the influence of acidic catalysts there result polymers which possess reactivity because of the presence of an unsaturated linkage in the carboxylic portions thereof. They can be reacted with other materials at this linkage or they can be reacted with themselves to form cross-linked, insoluble polymers. The polymers of this invention, and likewise copolymers and heteropolymers to be further discussed below, provide adhesives, coatings, molded objects and the like. First stage polymers can be chemically and hence permanently modified. The esters of this invention also form copolymers with other unsaturated compounds, particularly useful copolymers being those formed under the influence of acidic catalysts. Furthermore, the esters form heteropolymers with reactants such as maleic anhydride, citraconic anhydride, chloromaleic anhydride, etc.

Esters of unsaturated carboxylic acids and the vinyloxy-containing alcohols are most suitably prepared through alcoholysis of an ester of an unsaturated carboxylic acid and a lower monohydric saturated aliphatic alcohol by reaction with a vinyloxy-containing alcohol in the presence of an alkaline transesterification or alcoholysis catalyst. The lower aliphatic alcohol is displaced by the alcohol having a vinyl ether group and is desirably taken off by distillation, thus forcing the alcoholysis reaction to proceed to completion. The alkaline catalyst may then be removed or destroyed and the monomer purified in many cases by distillation under reduced pressure.

Catalysts for promoting alcoholysis are strongly basic compounds which are anhydrous, such as sodium alcoholates, potassium alcoholates, or other alkali metal alcoholates, examples of which are potassium butylate, sodium methylate, sodium ethylate, and potassium propylate. The catalysts include alkali metal alcoholates of the vinyloxy-containing alcohols. Quaternary ammonium alcoholates are of interest in that they have good solubilities in the reaction systems. Typical quaternary ammonium alcoholates include tetramethyl ammonium methoxide, tetramethyl ammonium tert.-butoxide, trimethyl benzyl ammonium methoxide, dimethyl dibenzyl ethoxide, dimethyl di(chlorobenzyl) ammonium methoxide, and the like. The concentration of catalyst needed to promote the exchange of alcohol groups is small; the presence of 0.05% to 1% of catalyst in the mixture of reactions is usually sufficient to promote the reaction. Small amounts of catalyst are desirably added from time to time as the reaction proceeds.

Esters of lower aliphatic alcohols and unsaturated carboxylic acids which are here used as reactants have the formula

where R° is a lower alkyl group, such as methyl, ethyl, propyl, or butyl, and R is a hydrocarbon group of at least two carbon atoms having aliphatic unsaturation. The acid portion of these esters corresponds to that of such acids as acrylic, α-methacrylic, α-ethacrylic, α-phenylacrylic, crotonic, cinnamic, β-ethacrylic, β,β-dimethylacrylic, vinylacetic, allylacetic, 2-methyl-2-butenoic, hydrosorbic, 2-ethyl-2-hexenoic, undecylenic, myristolenic, oleic, sorbic, 2,4-pentadienoic, geranic, linoleic, linolenic, elaeostearic, propiolic, methylpropiolic, 10-undecynoic, stearolic, and like acids. Thus R varies in the preferred acid groups from two to seventeen carbon atoms.

Vinyloxy-containing alcohols which are here used have the general formula

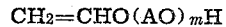

where A is an alkylene or hydrocarbon substituted alkylene group with a chain of at least two carbon atoms between oxygen atoms. The group A may conveniently contain as many as 14 carbon atoms or more. These alcohols are available from the reaction of acetylene and glycols in the presence of a strongly alkaline catalyst. Thus one mole of acetylene is reacted in the presence of sodium or potassium hydroxide with one mole of ethylene, propylene, trimethylene, butylene, hexylene, octylene, decamethylene, tetradecylene, diethylene, triethylene, pentaethylene, dipropylene, phenylethylene, or like glycol to give the monovinyl ether thereof. Such vinyl ether may be used directly for replacement of the lower alcohol group of a monocarboxylic ester. On the other hand the monovinyl ether alcohol may be modified by reaction with an alkylene oxide or similar oxide to give longer ether chains or mixed ether chains. Suitable oxides include ethylene oxide, propylene oxide, butylene oxide, styrylene oxide, butadiene monoxide, and the like.

Since vinyloxy-containing alcohols with mixed groupings have not been previously reported, typical preparations of vinyl ethers of polyglycols of various types are given in the following section.

*Example A*

A reaction vessel was charged with 44 parts by weight of sodium hydroxide and 4404 parts of β-vinyloxyethanol. This charge was stirred and heated to about 45° C., whereupon ethylene oxide was added in an amount of 587 parts by weight during the course of 49 minutes. The temperature of the reaction mixture was held at 50°–55° C. for six hours. The mixture was distilled through a packed column. Unreacted vinyloxyethanol was taken off at 42° C./15 mm. to 48° C./11 mm. A fraction was taken at 78°–79° C./2.5 mm. which corresponded in composition to vinyloxyethoxyethanol. This had a refractive index of 1.4468 at 20° C. Molecular refraction is 34.22 by the Lorentz and Lorenz formula. The calculated value is 34.21.

*Example B*

A reaction vessel was charged with 189 parts of vinyloxyethanol and 2 parts of flake sodium hydroxide. With the temperature of the charge kept at 48°–51° C. there was added thereto over 73 minutes 62 parts of propylene oxide. The reaction mixture was stirred and heated for two hours at about 45° C. and left standing for several days. The reaction mixture was fractionally distilled. After unreacted vinyloxyethanol had been taken off, a main fraction was taken at 66° C./1.2 mm. to 75° C./1.5 mm. which corresponded in composition to vinyloxy-2-propanol. The molecular weight found was 146.5 compared to a calculated value of 146.2.

*Example C*

A reaction vessel was charged with 79 parts of vinyloxyethoxyethanol and one part of potassium hydroxide. Ethylene oxide was bubbled into this charge with the temperature between 45° and 55° C., 21 parts being passed in during four hours. The temperature of the reaction mixture was held at 50° C. for two hours. The mixture was then distilled. The fraction taken at 90° C./1 mm. to 103° C./1 mm. amounted to 26 parts and corresponded in composition to vinyloxyethoxyethoxyethanol. This product has a refractive index of 1.4546 at 20° C.

This compound has been prepared by reaction of acetylene and triethylene glycol. It then has the same properties as the product prepared by the above described method.

*Example D*

To a charge of 252 parts of vinyloxyethanol, 0.1 part of β-naphthol, and 2.5 parts of potassium hydroxide there was slowly added at 40° to 60° C. 70 parts of butadiene monoxide. The reaction mixture was stirred and heated up to 70° C. for 1.5 hours and then distilled. The fraction collected at 68°–69° C./1 mm. corresponded in composition to $$CH_2=CHOCH_2CH_2OCH_2CH(OH)CH=CH_2$$

The refractive index was found as 1.4586 at 21° C.

*Example E*

In the same way 100 parts of vinyloxyethanol and 1.2 parts of potassium hydroxide were treated with 50 parts of styrene oxide at 40° to 60° C. The reaction mixture was heated on a water bath for three hours and then distilled. The desired product was obtained at 130°–142° C./1 mm. It corresponded in composition to vinyloxyethoxy(phenyl)ethanol. Its refractive index, $n_D^{20}$, was 1.5226.

*Example F*

A portion of 1,5-pentanediol was redistilled at 110°–113° C./0.35 mm. and 350 parts of the redistilled product was charged to a reaction vessel along with 52.5 parts of potassium hydroxide and heated to 210° C. to drive off water. The mixture was then passed to a tower maintained at a temperature between 172° and 196° C. and acetylene was passed through for 12 hours. The material was cooled and flushed with nitrogen. It was fractionally distilled under reduced pressure. A fraction taken at 80° C./18 mm.–84.5° C./16 mm. proved to be the divinyl ether of 1,5-pentanediol, having a refractive index, $n_D^{20}$, of 1.4452 and density of 0.8964. The monovinyl ether was distilled at 101°–102° C./14 mm. It has a refractive index, $n_D^{20}$, of 1.4491 and a density of 0.9372. The molecular refraction is 37.23 (thoretical 37.227).

Vinyloxy-5-pentanol was also prepared by heating 421.5 grams of 1,5-pentanediol and 12.2 grams of potassium in a rocking autoclave with acetylene maintained at 260–271 pounds per square inch pressure and at a temperature from 145°–158° C. The product was fractionally distilled and the monovinyl ether collected at 110°–112° C./28 mm.

There were heated together 50 parts of vinyloxypentanol and one part of potassium hydroxide at 50° C. and ethylene oxide was run in until an equivalent weight thereof had been taken up. The product was washed several times with hot water to remove the catalyst, was dried over sodium carbonate and was stripped by heating to 120° C./1 mm. The residue corresponded in composition to vinyloxypentyloxyethanol.

*Example G*

A reaction flask fitted with a stirrer, thermometer, reflux condenser, and dropping funnel was charged with 264 grams of vinyloxyethanol, 2 grams of β-naphthol, and 3 grams of potassium hydroxide. With a batch temperature of 80°–100° C. 114 grams of allyl glycidyl ether was added dropwise. The batch was allowed to stand 18 hours at 30° C. and then was heated at 100° C. for two hours. Direct distillation resulted in (a) recovery of excess and unreacted vinyloxyethanol and (b) 167 grams of the addition product, $$CH_2=CH-O-C_2H_4O-CH_2CH(OH)CH_2OCH_2CH=CH_2$$

which distilled at 107° C./2 mm. and had a refractive index, $n_D^{20}$, of 1.4597.

Acetylene was reacted with other glycols in the presence of potassium or potassium hydroxide to give vinyl ether alcohols. Temperatures between about 130° and 150° C. were used with acetylene pressures between 300 and 500 p. s. i.

The monovinyl ether of 2,2-dimethyl-1,3-propanediol was distilled at 165°–168° C. and had a refractive index of 1.4413. The monovinyl ether of 1,4-butanediol was distilled at 98°–101° C./27 mm. and had a refractive index of 1.4440. The monovinyl ether of phenylethanediol was distilled at 76°–79° C./1 mm. and had a refractive index of 1.5220. The monovinyl ether of 2-ethyl-1,3-hexanediol was distilled at 64°–71° C./1.5 mm. and had a refractive index of 1.4471.

Any of these ether alcohols may be reacted with an alkylene oxide or similar oxide to give a polyether alcohol. Thus, vinyloxy-2-ethyl-3-hexanediol and propylene oxide yield a vinyloxyoctyloxypropanol. Vinyloxybutanol and ethylene oxide yield with one mole of the oxide vinyloxybutoxyethanol or with another mole of the oxide vinyloxybutoxyethoxyethanol, and so on.

A convenient method for carrying out the alcoholysis of an ester of a lower aliphatic alcohol and an unsaturated monocarboxylic acid with a vinyloxy-containing alcohol comprises placing in a reaction vessel a vinyl ether alcohol and adding thereto an alkaline alcoholysis catalyst. This ensures alkalinity of the reaction mixture from the start and is desirable since vinyl ethers including vinyl ether alcohols are sensitive to acids. If an alcoholate of the vinyl ether alcohol is to serve as catalyst, sodium, as a typical alkali metal, is added to the vinyl ether alcohol and reacted therewith. Otherwise an anhydrous alkaline catalyst, such as an alkali metal lower alcoholate, is used. An ester of an unsaturated carboxylic acid is then added, usually in an amount at least equivalent to the vinyl ether alcohol. The reaction mixture is stirred and heated. Reaction temperatures between 50° and 180° C. under normal, reduced, or increased pressures are useful. Catalyst may be added from time to time, if desired, particularly if the reaction appears to become sluggish. It is often very helpful to have present during the reaction a small amount of a polymerization inhibitor, such as β-naphthol.

Alcohol displaced from the original ester is taken off by distillation. If this alcohol and the reacting ester form an azeotrope, the alcohol is conveniently removed in this form and enough of such ester is used to allow for this behavior. When alcohol is no longer evolved, the reaction mixture is worked up. The catalyst can be removed or destroyed as by washing or neutralization. An organic acid may be used or carbon dioxide or a strong acid. If a strong acid is used, an excess thereof must be avoided. While it is ordinarily desirable to destroy the alkaline catalyst, this step is not always essential as the new ester can in many cases be isolated from an alkaline reaction mixture by distillation at low pressures.

Typical procedures for preparing vinyloxy-containing esters of unsaturated acids are shown in the following illustrative examples.

*Example 1*

There were mixed 680 parts by weight of methyl methacrylate, 150 parts of vinyloxyethanol, 10 parts of a 10% solution of sodium methylate in methanol, and small amounts of β-naphthol and copper powder as inhibitors. The mixture was heated in a jacketed reaction vessel and the binary mixture of methyl alcohol and methyl methacrylate was distilled from the mixture. Another 10 parts of catalyst solution was added from time to time. The temperature of the fluid in the jacket was finally raised to 175° C. The batch was then stripped under low pressure and the residue thus obtained distilled. The fraction taken at 55°–60° C./2 mm. was chiefly vinyloxyethyl methacrylate. It was redistilled at 55° C./2 mm. to give 227 parts of relatively pure material having a refractive index at 20° C. of 1.4475, an acid number of zero, and a saponification number of 362 (theory 359).

*Example 2*

A reaction mixture of 228 parts of ethyl crotonate, 88 parts of vinyloxyethanol, and 25 parts of a solution of sodium ethylate was prepared by dissolving 1.5 parts of sodium in 24 parts of anhydrous ethanol. A small amount of β-naphthol was added as a polymerization inhibitor. The mixture was heated under slightly reduced pressure and ethanol was taken off at 60° C. The temperature of the heating bath used was finally carried to 150° C. The reaction mixture was cooled, diluted with an equal volume of benzene, and washed with water. Potassium carbonate was added to aid in forming layers. The organic layer was taken, dried over potassium carbonate, and distilled. The desired product, vinyloxyethyl crotonate, distilled at 102° C./19 mm. The product had a refractive index at 20° C. of 1.4551. It had a zero acid number and gave a saponification number of 362 (theory 359).

*Example 3*

There was prepared methyl 2-ethyl-2-hexenoate from methyl alcohol and 2-ethyl-2-hexenoic acid prepared according to the method of Lichtenberger and Naftali, Bull. Soc. Chim. (5) 4, 325–333 (1937). A portion of 78 parts by weight of this ester was added to 66 parts of vinyloxyethoxyethanol which had been treated with 0.3 part of sodium. This mixture was heated with distillation of methanol. The reaction product was taken up in benzene and washed with a little dilute acetic acid solution and water and then dried over potassium carbonate. The benzene was stripped off under reduced pressure with heating on a steam bath. The residue corresponded in composition to vinyloxyethoxyethyl 2-ethyl-2-hexenoate.

*Example 4*

A mixture of 148 parts of methyl oleate, 132 parts of vinyloxyethanol, and 12 parts of a 10% sodium methylate solution in methanol was heated in a jacketed reaction vessel. Methanol was distilled off. The reaction mixture was then cooled, diluted with benzene, and washed with aqueous sodium bicarbonate solution. The organic layer resulting was dried over potassium carbonate and distilled. The fraction taken at 180°–208° C./1 mm. was vinyloxyethyl oleate. As obtained it had a zero acid number and a saponification number of 163 (theory 159). Its refractive index at 20° C. was 1.4581.

*Example 5*

A mixture of 148 parts of methyl linoleate containing some methyl oleate, 132 parts of vinyloxyethyl alcohol, and 10 parts of a 10% sodium methylate solution in methyl alcohol was heated. Methyl alcohol was taken off under reduced pressure and the product was worked up as in the previous example. The product was distilled at 188°–205° C./1 mm. It had a refractive index of 1.4634 at 24° C. There was obtained a 69% yield of vinyloxyethyl linoleate containing a small amount of vinyloxyethyl oleate.

Example 6

There were mixed 585 parts of methyl acrylate, 150 parts of vinyloxyethanol, 0.4 part of copper powder, 3.7 parts of β-naphthol, and 5 parts of a 10% sodium methylate solution in methanol. The mixture was heated and methyl alcohol-methyl acrylate binary mixture taken off. Another 20 parts of the sodium methylate solution was added in portions from time to time. There was an exothermic reaction due to a reaction between the alcoholic hydroxyl groups present and the double bond of the acrylate. The reaction mixture was fractionally distilled. At 67°–70° C./12 mm. a fraction was obtained which was identified as vinyloxyethyl acrylate,

It had a density of 1.024 and a refractive index, $n_D^{20}$, of 1.4447. There was obtained at 107° C./12 mm. a fraction which was identified as methyl β-(β-vinyloxyethoxy)propionate. It had a refractive index of 1.4390 at 20° C.

In view of the side reaction the above method is not as good a method for preparing acrylates of this type as is the procedure in which the vinyloxy-containing alcohol is reacted with acrylic anhydride. The product thus obtained has the same properties as the product obtained above.

Example 7

There were mixed 35 parts of 4-vinyloxybutanol, 200 parts of methyl methacrylate, 0.5 part of sodium dissolved in 15 parts of methanol, and a trace of β-naphthol. This mixture was heated with distillation of the methanol-methyl methacrylate azeotrope. The mixture was finally stripped under reduced pressure, washed with an aqueous potassium carbonate solution, dried over potassium carbonate, and distilled under low pressure. The fraction taken at 75°–80° C./2 mm. amounted to 46 parts by weight and corresponded in composition to 4-vinyloxybutyl methacrylate. The fraction had a zero acid number, a saponification number of 300 (theory 304), and a refractive index of 1.4482 at 20° C.

Example 8

There were mixed 78 parts of vinyloxyethoxyethanol, 230 parts of methyl methacrylate, and a solution of 0.75 part of sodium in a small amount of methanol. The mixture was heated with reflux and small portions of sodium methylate added from time to time to a total of 0.75 part of sodium as metal. The reaction mixture was washed with water, dried, and distilled. A considerable amount of residue indicated that some polymerization had occurred. The distillate was taken up to 145° C./12 mm. and was redistilled in the presence of hydroquinone. The fraction obtained at 80°–82° C./1 mm. was identified as vinyloxyethoxyethyl methacrylate. It had a refractive index, $n_D^{20}$, of 1.4515.

Example 9

There were reacted by heating together as above 33 parts of vinyloxyethoxy-1-methylethanol, 150 parts of methyl methacrylate, and a sodium methylate solution formed by dissolving 0.5 part of sodium in methanol in the presence of a small amount of β-naphthol. The product was worked up by washing, drying, and distilling, the fraction taken at 88°–93° C./1 mm. amounting to 27 parts and corresponding to vinyloxyethoxy-1-methylethyl methacrylate in composition. Its refractive index at 18° C. was 1.4494.

Example 10

There were similarly reacted 54 parts of vinyloxyethoxy-1-vinylethanol and 150 parts of methyl methacrylate in the presence of β-naphthol as an inhibitor and as catalyst sodium methylate prepared from 0.5 part of sodium and methanol. There was produced 38 parts of vinyloxyethoxy-1-vinylethyl methacrylate which distilled at 90°–110° C./2 mm. It had a saponification number of 246 (theory 248) and a refractive index, $n_D^{20}$, of 1.4600.

Example 11

In a similar fashion there were reacted 52 parts of vinyloxyethoxy-1-phenylethanol and 150 parts of methyl methacrylate in the presence of β-naphthol, as inhibitor, and, as catalyst, sodium methylate prepared from 0.5 part of sodium in methanol. There was obtained at 140°–160° C./2 mm. a fraction which was chiefly vinyloxyethoxy-1-phenylethyl methacrylate. It had a refractive index $n_D^{21}$, of 1.5100.

Example 12

There were mixed 24.5 parts of vinyloxy-1-methylethanol, 100 parts of methyl methacrylate, a solution made by dissolving 0.5 part of sodium in 10 parts of methanol, and a small amount of β-naphthol as inhibitor. The mixture was heated with distillation of methanol and methyl methacrylate and the reaction product was worked up with washing, drying, and distillation. The fraction taken at 65° C./20 mm. to 85° C./1 mm. was redistilled at 50° C./1 mm. to give 23 parts of pure vinyloxy-1-methylethyl methacrylate. This had a refractive index of 1.4400 at 20° C.

Example 13

There were mixed 107.6 parts of methyl methacrylate, 0.07 part of copper powder, 0.7 part of β-naphthol, 35 parts of vinyloxy-5-pentyl alcohol, and a solution of 0.3 part of sodium in 5 parts of methanol. This mixture was stirred and heated for 11 hours to a pot temperature of 111° C. and a vapor temperature of 68° C. Excess methyl methacrylate was distilled off under reduced pressure. There was obtained as a fraction distilling at 110°–120° C./13 mm. a fraction which was chiefly vinyloxypentyl methacrylate. This was redistilled in the presence of a little β-naphthol at 112°–115° C./7 mm. to give a 45% yield of pure ester having a refractive index of 1.4525 at 20° C. and a density, $$d_{20}^{20}$$

of 0.964.

Example 14

There were mixed 320 parts of butyl methacrylate, 150 parts of vinyloxyethanol, 10 parts of a 10% sodium methylate solution in methanol, 3 parts of β-naphthol, and 5 parts of copper powder. The mixture was heated and methanol and butanol were taken off. Another 10 parts of sodium methylate solution was added during the course of the reaction. The temperature of the reaction mixture was then raised to about 150° C. and stripped under reduced pressure. The residue was then distilled and a fraction taken at 54° to 57° C. at about 2 mm. pressure. The distillate was pure vinyloxyethyl methacrylate.

Example 15

There were mixed 121 parts of 3-vinyloxy-2-ethylhexanol, 300 parts of methyl methacrylate, one half part of sodium dissolved in a small amount of methanol, and a trace of β-naphthol. The mixture was stirred and heated with distillation of the methanol-methyl methacrylate binary. Additional catalyst was added as the reaction progressed. The reaction mixture was cooled, washed with water, and dried over anhydrous potassium carbonate. It was then distilled. The fraction taken at 90°–115° C./2 mm. contained the desired product. It was fractionally redistilled through a column. At 105°–115° C./3 mm. the fraction was almost pure 3-vinyloxy-2-ethylhexyl methacrylate. The refractive index, $n_D^{29}$, was 1.4461.

Example 16

By the procedure described in Example 15 there were mixed and reacted 130 parts of 3-vinyloxy-2,2-dimethylpropanol and 400 parts of methyl methacrylate with the addition from time to time of a solution of 1.5 parts of sodium methoxide in methanol as catalyst and a small amount of β-naphthol as inhibitor. When methanol was no longer evolved, the reaction mixture was cooled and washed with water. The organic layer was salted out with potassium carbonate. Distillation of this layer gave the excess methyl methacrylate, some forerun, and a fraction distilling at 71° C./1.5 mm., which corresponded in composition to 3-vinyloxy-2,2-dimethylpropyl methacrylate. It had an acid number of 0.1, a saponification number of 281 (theory 283), and a refractive index, $n_D^{29}$, of 1.4417.

Example 17

A mixture of 16 parts of vinyloxyethoxyethoxyethanol and 150 parts of methyl methacrylate was treated with a little β-naphthol and sodium methoxide in methanol and heated with distillation of the methanol-methyl methacrylate binary. Small additional portions of sodium methoxide in methanol were added from time to time, a total of 0.5 part of sodium methoxide being used. The reaction mixture was cooled, washed with water, and dried with potassium carbonate. The dried reaction mixture was stripped of methyl methacrylate at low pressure and a fraction taken off between 77° and 90° C./1 mm. There remained a residue of 14 parts, which was chiefly vinyloxyethoxyethoxyethyl methacrylate. A portion of this material was distilled at about 109° C./1 mm. Some polymerization resulted during this operation.

Example 18

There was dissolved in 30 parts of vinyloxyethanol about 0.4 part of sodium. Thereto was added 75 parts of methyl sorbate. This mixture was heated at atmospheric pressure for four hours with elimination of methyl alcohol. The batch was then vacuum distilled. The fraction taken at 85°–100° C./0.7–0.8 mm. was redistilled at 95°–101° C./0.4 mm. to give vinyloxyethyl sorbate, for which the refractive index, $n_D^{20}$, is 1.5058.

The compounds of this invention yield particularly interesting polymers under the influence of acidic catalysts, usually at low temperatures. The polymerization reaction is best carried out in the presence of an organic solvent, particularly one which remains liquid at low temperatures. For this purpose there may be used such liquids as propane, methyl chloride, and the like. Temperatures between 50° C. and −80° C. are useful. As catalyst there may be used boron trifluoride and its coordination complexes with oxygenated compounds such as ethers, ketones, alcohols, or carboxylic acids, iodine, phosphoric acid, p-toluene sulfonic acid, aluminum chloride, stannic chloride, and the like. The more active catalysts require lower temperatures than the less active.

The polymers obtained by acid catalysis are thermoplastic resins which are soluble in organic solvents. They can be converted by free-radical catalysis or oxidation into insoluble polymers. The primary polymers can thus be used for coatings and laminations and for binding and the like operations wherein cross-linking and insolubilizing at a later stage are desirable features.

Polymerization can also be effected with free radical catalysts, which include both organic peroxides and azo catalysts, such as azodiisobutyronitrile and dimethyl azodiisobutyrate. These catalysts lead to insoluble polymers and copolymers.

There follow some typical examples of polymer formation. These will supply additional details in regard to methods of procedure, properties of polymers, and conversion of primary polymers to insoluble products.

Example 19

There were taken 15 parts by weight of vinyloxyethyl acrylate, 68 parts of liquid methyl chloride, and 70 parts of solid carbon dioxide. The mixture was cooled to −71° C. (−96° F.) and one part of a 15% boron trifluoride-ethyl ether solution was added. The temperature of the batch rose to −66° C. as polymerization progressed. The polymerizing mixture was kept at a low temperature for 2.5 hours and then allowed to increase slowly in temperature with evaporation of methyl chloride. At a temperature of +5° C. there were added 20 parts of benzene and 50 parts of water to which 0.264 part of sodium hydroxide had been added. The resulting mixture was well stirred for 20 minutes. Layers were allowed to form and were separated. The benzene solution of polymer was dried over anhydrous sodium sulfate, filtered, and concentrated under reduced pressure. The residue was stripped by being heated to 45° C./1 mm. to give an amber colored, very viscous liquid which was polyvinyloxyethyl acrylate. The yield was 96%. The viscosity of a 32.8% solution of this polymer in toluene was 3.6 cs. at 100° F.

This polymer becomes insoluble when heated with an organic peroxide, such as benzoyl peroxide. Films of the polymer when air dried on metal sheet for seven days became tough and insoluble in benzene. Films containing a trace of cobalt naphthenate air-dried at 30° C. in two days and became insoluble in 15 minutes when baked at 150° C. These films were transparent, exceedingly hard and abrasion resistant.

Example 20

A polymerization vessel was charged with 15 parts of β-vinyloxyethyl methacrylate and cooled with a bath of acetone and solid carbon dioxide to −80° F., at which point the vinyloxyethyl methacrylate solidified. The solid melted at 0° F. About 45 parts of liquid propane was added, but since this did not dissolve the solid, 45 parts of liquid methyl chloride at −58° F. was added. This mixture dissolved the ester. There were added 70 parts of solid carbon dioxide and one part of a 15% boron trifluoride-ethyl ether solution. The reaction mixture was stirred and kept cold with an external bath. There formed a polymer which separated as a white solid. After four hours the liquid in the vessel was decanted from the solid, which was treated with 50 parts of 0.5% sodium hydroxide solution and 20 parts of benzene to dissolve the polymer. The aqueous layer was drawn off. The benzene solution was dried over sodium sulfate, filtered, and evaporated. The residue obtained was stripped of volatile material by being heated to 50° C./1 mm. to form a tacky solid. A 30% solution thereof in toluene had a viscosity of 23.4 cs. at 100° F.

Films of this polymer were deposited on metal sheets from a toluene solution. The films were air-dried for nine days, at which time they were clear, hard, and insoluble in common organic solvents. The presence of a cobalt drier greatly hastened air drying. When the polymer was heated with benzoyl peroxide for 15 minutes at 150° C. an exceptionally hard, insoluble film resulted.

In the same way polymers can be prepared from the other vinyloxy-containing esters of unsaturated acids. Vinyloxyethyl crotonate yields exceptionally hard, insoluble films. Vinyloxyethyl oleate gives films which become insoluble in the presence of a trace of cobalt drier. Increasing the number of ether linkages or the length of the alkylene chain improves the toughness and tenacity of the final polymers and decreases shrinkage during final cure.

Example 21

In 44 parts of methyl chloride there were dissolved 10 parts of vinyloxyethyl linoleate (containing some oleate). With the mixture at −15° C. there was added 0.695 part of a 20% boron trifluoride-ether complex. During a 2.5 hour period the mixture was allowed to reach a temperature of 17° C. The polymer formed was taken up in 10 parts of benzene and washed with 10% sodium bicarbonate solution. Solvent was stripped off at reduced pressure to yield a viscous liquid polymer. Films of this polymer were applied to metal sheet and air dried. They remained tacky for several days. A sample treated with benzoyl peroxide formed a tough insoluble film when baked at 150° C. for 15 minutes. Another sample treated with a cobalt drier air-dried within two days to a tough, insoluble film.

Example 22

When vinyloxyethyl sorbate was cooled in an acetone-Dry Ice bath, it formed a glassy solid. Treatment of a methyl chloride solution of this ester in the cold with one per cent of its weight of a 20% boron trifluoride-ether catalyst caused polymerization with a rise in temperature. The polymer was taken up in benzene and this solution was washed with 10% sodium bicarbonate solution. The benzene solution was applied to metal. A non-tacky film resulted in 2.5 hours. In three days the film was very hard and insoluble in benzene. The same result was achieved in 15 minutes by adding a little benzoyl peroxide and baking at 150° C. Cobalt drier had the same effect.

Example 23

About 10 parts of vinyloxyethyl methacrylate was treated with 0.01 part of azodiisobutyronitrile and heated to 60°–70° C. for four hours. There was formed a hard, insoluble polymer.

Example 24

A solution of 15 parts of 4-vinyloxybutyl methacrylate in 49 parts of methyl chloride was chilled to −109° F. and treated with one part of 20% boron trifluoride-ether catalyst. The solution was allowed to warm up during the course of four hours. Polymerization occurred during this time. The polymer was treated with 15 parts of 10% sodium bicarbonate solution and dried under reduced pressure. A 20% solution of this polymer in methyl methacrylate had a viscosity of 6.3 cs. at 100° F. When this solution was treated with benzoyl peroxide and heated, it gave a tough, hard, insoluble product.

Example 25

As above, there was polymerized 5-vinyloxypentyl methacrylate. The polymer was taken up in benzene, freed of catalyst by washing with sodium bicarbonate solution, and dried over potassium carbonate. The benzene solution was treated with 0.05% of benzoyl peroxide and applied to metal sheet. A hard, tough, tenaciously adhesive film resulted when the metal sheet was baked at 135° C. for 15 minutes.

Copolymers are readily formed with the vinyloxy-containing esters of unsaturated acids and other unsaturated polymerizable compounds such as vinyl ethers, vinyl aryls, such as styrene, isobutylene, etc. As an example of typical copolymerization there follow the details of the preparation of typical copolymers.

Example 26

A mixture of 15 parts of vinyloxyethyl methacrylate, 45 parts of allyl vinyl ether, and 240 parts of n-butyl vinyl ether was added slowly to a polymerization vessel which was cooled in an acetone-solid carbon dioxide bath and which contained 1200 parts of liquid methyl chloride, 20 parts of 15% boron trifluoride-ethyl ether complex, and 750 parts of powdered solid carbon dioxide. The resulting mixture was held at −78° C. for 40 minutes and then allowed to warm up with evaporation of methyl chloride. There were added about 500 parts of benzene and 500 parts of an aqueous 1.2% sodium hydroxide solution. The mixture was stirred for 15 minutes and then allowed to separate. The organic layer was dried over sodium sulfate and filtered. The benzene was evaporated and the residue stripped at 40° C./ mm. to give 250 parts of copolymer. A 30% solution thereof in toluene had a viscosity of 5 cs. at 100° F. The copolymer could be readily insolubilized with an organic peroxide or a cobalt drier. Films from the above copolymer were somewhat soft. Increased hardness from similar copolymers was obtained as the proportion of vinyloxyethyl methacrylate was increased.

Example 27

A copolymer was made from a mixture of five parts of vinyloxyethyl methacrylate and 10 parts of styrene. The mixture was dissolved in propane and methylene chloride and treated with 0.3 part of aluminum chloride at −96° F. The temperature was allowed to rise to 20° C. with several additions of small amounts of aluminum chloride. The reaction mixture was washed with a dilute sodium hydroxide solution, separated, filtered, dried, and concentrated. A dry, white, non-tacky resin was obtained. A 30% solution of this polymer in toluene had a viscosity of 16.6 cs. at 100° F. This polymer was treated in toluene solution with 0.01% of benzoyl peroxide to give films which became hard and insoluble when baked at 150° C. for 15 minutes.

Example 28

Copolymers can also be made from a polyvinyloxy-containing ester of an unsaturated carboxylic acid and an unsaturated polymerizable compound such as a vinyl ester, allyl ester, acrylic ester, methacrylic ester, styrene, or the like with the aid of a peroxide catalyst.

(a) A copolymer was prepared at 80°–96° C. from 25 parts of polyvinyloxyethyl acrylate and 75 parts of vinyl acetate with benzoyl peroxide as the catalyst. The product was a translucent, rubber-like, non-tacky, insoluble resin.

(b) A copolymer from 18 parts of polyvinyloxyethyl acrylate and 82 parts of styrene was a clear, vitreous resin which was insoluble in acetone, toluene, or ethylene dichloride. It had a hardness such that it was not scratched with a 5H pencil.

(c) A copolymer from 15 parts of polyvinyloxyethyl acrylate and 85 parts of methyl methacrylate was similar to the previous copolymer except that it had a hardness equal to 8H.

Example 29

There were mixed 5.75 parts of vinyloxyethyl crotonate, 19.25 parts of styrene, 50 parts of methyl chloride, and 0.5 part of boron trifluoride at −96° F. The temperature was allowed to rise slowly. Copolymerization took place. There was added 74.6 parts of benzene and the methyl chloride was allowed to evaporate. This benzene solution was washed with a 5% soda ash solution and dried over sodium sulfate. A 25% solution of copolymer in benzene had a viscosity of 99.1 cs. at 100° F. When films were formed from the benzene solution, they became hard when baked with a cobalt drier or an organic peroxide. The films did not swell when immersed in benzene. The above copolymer can be used as a molding powder which is activated with peroxide such as tert.-butyl hydroperoxide. The molded products are hard and insoluble.

Example 30

A reaction vessel equipped with a stirrer and cooled with an acetone-solid carbon dioxide bath was charged with 127 parts of liquid methyl chloride, 27 parts of pure isobutylene, and 27 parts of vinyloxyethyl methacrylate. With this charge cooled to −74° C. there was added over a 17 minute period 2.7 parts of boron trifluoride. There was considerable heat evolved as copolymerization took place with the temperature rising to −70° C. Some copolymer separated in the solvent. After four hours the reaction mixture was allowed to warm up with evaporation of methyl chloride. The batch was stripped of volatile material at 29° C. under a pressure of 30 mm. to give 41.2 parts of resin. This was treated with a solution of 11 parts of sodium bicarbonate in 140 parts of water and dissolved in benzene. The benzene solution was dried over potassium carbonate, filtered, and stripped of solvent at 55° C./10 mm. to give 34.6 parts of a clear brownish liquid resin, which was soluble in toluene. Films on metal sheet were formed from the solution with (a) no catalyst, (b) cobalt drier, and (c) benzoyl peroxide. When the films were baked for 40 minutes at 150° C., the films became hard and insoluble in all cases. A film containing cobalt drier became hard in four days at room temperature. A film without drier remained tacky.

Example 31

A reaction vessel equipped with stirrer and cooled with an acetone-solid carbon dioxide bath was charged with 83.7 parts of methyl chloride, 7.5 parts of vinyloxyethyl methacrylate, 42.5 parts of freshly distilled styrene, and 55 parts of powdered solid carbon dioxide. With the temperature of this mixture at −80° C. 1.63 parts of boron trifluoride was added over a period of 15 minutes. An exothermal reaction took place, causing the reaction mixture to boil. After 1.5 hours it became too viscous to be stirred. At this point 9 parts of sodium bicarbonate was added. The temperature of the mixture was raised to 0° C., and 120 parts of benzene and 30 parts of water were added. The benzene layer was separated, dried over sodium sulfate, and filtered through a bed of diatomaceous earth. The filtrate contained 20.4% of resin. It had a viscosity of 70 cs. at 100° F.

Copolymer was precipitated from 50 parts of benzene solution by addition thereto of 160 parts of methanol. The copolymer was dried at 50° C. for 12 hours to yield 9.6 parts of a dry, white powder. When molded at 150° C. under 8000 lb./sq. in., a sample of the copolymer gave a product which had a hardness of 2H and which swelled in benzene. To a portion of the powdered copolymer there was added 1.2% of tert.-butyl hydroperoxide. When the thus treated powder was molded, an object was obtained which was hard and insoluble in toluene.

The copolymers of vinyloxy-containing esters of unsaturated carboxylic acids and polymerizable vinylidene compounds, particularly monovinylidene compounds, can be prepared with a wide range of proportions. The copolymers may advantageously be based on 0.3% to 95% of one of the esters of this invention, the balance being one or more other polymerizable monovinylidene compound, typical of which are styrene, p-methylstyrene, α-methylstyrene, isobutylene, vinyl methyl ether, vinyl butyl ether, vinyl octyl ether, vinyl dodecyl ether, octyl allyl ether, vinyl acetate, vinyl butyrate, methyl acrylate, ethyl acrylate, methyl methacrylate, ethyl methacrylate, butyl methacrylate, and the like. The catalyst used for preparing copolymers will, of course, be selected to fit the combination selected, acid catalysts being best for some, azo catalysts for others, and other types of catalysts for various combinations.

Instead of one of the monovinylidene compounds named above copolymers may also be formed with polyvinylidene compounds, typical of which are diallyl phthalate, dimethallyl phthalate, vinyl acrylate, allyl acrylate, allyl methacrylate, ethylene diacrylate, allyl crotonate, allyl vinyl ether, allyl succinyl allyl glycolate, and the like.

The vinyloxy-containing esters also form heteropolymers. Examples of the formation of a heteropolymer follow.

Example 32

There were mixed 10 parts of vinyloxyamyl methacrylate, 10 parts of maleic anhydride, 20 parts of dry benzene, and 0.5 part of benzoyl peroxide. The mixture was heated for 15 minutes under reflux at 80° C. with a reaction occurring to render the mixture semi-solid. It was then heated for three hours at 81°–82° C. and at 118° C. for 30 minutes under a pressure of 30 mm. There resulted 19 parts of a solid heteropolymer. In place of vinyloxyethyl methacrylate there may be used other vinyloxy esters of unsaturated acids and maleic anhydride may be replaced with other α,β-unsaturated anhydrides. These two starting materials form heteropolymers in about a one to one molar ratio.

*Example 33*

There were mixed 312 parts of vinyloxyethyl crotonate, 392 parts of maleic anhydride, and 200 parts of dry benzene and thereto 10 parts of benzoyl peroxide were added. The mixture was heated on a water bath. Between 70° and 80° C. a vigorous action occurred, resulting in the formation of a heteropolymer which was a cream colored, brittle, vitreous resin which was insoluble in benzene.

A related type of interpolymer is prepared by reacting a first-stage soluble vinyl polymer from one of the vinyloxyalkyl carboxylates of this invention and a maleic-type anhydride under the influence of a free radical catalyst. Thus, a soluble polymer such as polyvinyloxyethyl acrylate or polyvinyloxypropyl methacrylate is mixed with maleic anhydride, chloromaleic anhydride, citraconic anhydride, or the like, preferably in an inert organic solvent, the aromatic hydrocarbons being particularly suitable over a wide range of proportions.

*Example 34*

In a reaction vessel there were mixed 3 parts of maleic anhydride, 9 parts of the fluid polymer of 5-vinyloxypentyl methacrylate, this being a polyvinyl resin formed in the cold under the influence of boron trifluoride-ethyl ether complex, 0.02 part of benzoyl peroxide, and 50 parts of dry toluene. This mixture was heated on a water bath to 80°–85° C. In about 15 minutes a vigorous reaction ensued, whereupon a white solid reaction product formed and precipitated. After the solvent had been decanted off, the product was dried at 80° C. for 18 hours. There was thus obtained 8 parts of a hard, brittle, vitreous resin.

The unsaturated groups in the acid residues of a primary polymer, which is soluble, react by addition with compounds having a reactive hydrogen, such as alcohols, mercaptans, primary and secondary amines, cyanoacetates, etc. The addition is usually promoted with an alkaline catalyst. A typical example of such an addition reaction follows.

*Example 35*

To 10 parts of polyvinyloxyethyl acrylate was added 14.2 parts of dodecyl mercaptan and then 0.2 part of sodium methoxide. The mixture was stirred and in about five minutes an exothermic reaction set in, resulting in a dough-like mass. The mixture was stirred for 2.5 hours, when 110 parts of toluene were added, followed by 8 parts of sulfuric acid. Water was then added in an amount of 100 parts and the mixture heated to 50° C. to effect separation of water and organic layer. The reaction products were partly but not completely soluble in toluene.

We claim:

1. As new chemical substances, compounds of the formula $$CH_2=CHO(AO)_mCOR$$

wherein R is an acyclically unsaturated hydrocarbon group of at least two carbon atoms and of not over 17 carbon atoms, A is a member of the class consisting of alkylene groups of not over fourteen carbon atoms, vinyl substituted alkylene groups, and phenyl substituted alkylene groups, and m is an integer not over six.

2. As new chemical substances, compounds of the formula $$CH_2=CHO(C_nH_{2n}O)_mCOR$$

wherein R is an olefinically unsaturated hydrocarbon group of two to seventeen carbon atoms, n is an integer from two to fourteen, and m is an integer from one to three.

3. Compounds of claim 2 wherein R is a —C(CH$_3$)=CH$_2$ group.

4. As a new chemical compound, vinyloxyethyl methacrylate.

5. As a new chemical compound, vinyloxyethoxyethyl methacrylate.

6. As a new chemical compound, vinyloxybutyl methacrylate.

7. As a new chemical compound, vinyloxypentyl methacrylate.

8. As new chemical substances, compounds of the formula $$CH_2=CHO(C_nH_{2n}O)_mCOCH=CHCH_3$$

wherein n is an integer from two to fourteen and m is an integer from one to three.

9. As a new chemical compound, vinyloxyethyl crotonate.

10. A process for preparing a compound of the formula $$CH_2=CHO(AO)_mCOR$$

which comprises reacting between 50° and 180° C. an ether alcohol of the formula $$CH_2=CHO(AO)_mH$$

and an ester of a lower monohydric saturated aliphatic alcohol and an acid of the formula HOOCR in the presence of an anhydrous basic alkali metal alcoholate as catalyst, R being an acyclically unsaturated hydrocarbon group of 2 to 17 carbon atoms, A being a member of the class consisting of alkylene groups of not over 14 carbon atoms, vinyl substituted alkylene groups, and phenyl substituted alkylene groups, and m is an integer not over six.

11. A process for preparing a compound of the formula $$CH_2=CHO(CH_2CH_2O)_mCOR$$

which comprises reacting between 50° and 180° C. in the presence of an anhydrous basic alkali metal alcoholate as catalyst an ether alcohol of the formula $$CH_2=CHO(CH_2CH_2O)_mH$$

and an ester of a lower aliphatic saturated monohydric alcohol and an acid of the formula HOOCR, neutralizing the reaction mixture, and separating a said compound, R being an acyclically unsaturated hydrocarbon group of 2 to 17 carbon atoms, and m being an integer not over three.

12. The process of claim 11 wherein R is the —C(CH$_3$)=CH$_2$ group.

13. The process of claim 11 wherein R is the —CH=CHCH$_3$ group.

14. Polymers of compounds of the formula $$CH_2=CHO(AO)_mCOR$$

wherein R is an acyclically unsaturated hydrocarbon group of two to seventeen carbon atoms, A is a member of the class consisting of alkylene groups of not over fourteen carbon atoms, vinyl substituted alkylene groups, and phenyl substituted alkylene groups, and m is an integer not over six.

15. Polymers of compounds of the formula $$CH_2=CHO(C_nH_{2n}O)_mCOR$$

wherein R is an olefinically unsaturated hydrocarbon group of two to seventeen carbon atoms, $n$ is an integer from two to fourteen, and $m$ is an integer from one to three.

16. Polymers of compounds of the formula $$CH_2=CHO(C_nH_{2n}O)_mCOC(CH_3)=CH_2$$

wherein $n$ is an integer from two to fourteen and $m$ is an integer from one to three.

17. Polymers of compounds of the formula $$CH_2=CHO(C_nH_{2n}O)_mCOCH=CHCH_3$$

wherein $n$ is an integer from two to fourteen and $m$ is an integer from one to three.

18. Copolymers of a compound of the formula $$CH_2=CHO(AO)_mCOR$$

wherein R is an acyclically unsaturated hydrocarbon group of two to seventeen carbon atoms, A is a member of the class consisting of alkylene groups of not over fourteen carbon atoms, vinyl substituted alkylene groups, and phenyl substituted alkylene groups, and $m$ is an integer not over six, and another polymerizable monovinylidene compound.

19. Copolymers of a compound of the formula $$CH_2=CHO(C_nH_{2n}O)_mCOR$$

wherein R is an olefinically unsaturated hydrocarbon group of two to seventeen carbon atoms, $n$ is an integer from two to fourteen, and $m$ is an integer from one to three, and another polymerizable monovinylidene compound.

20. Copolymers of compounds of the formula $$CH_2=CHO(C_nH_{2n}O)_mCOC(CH_3)=CH_2$$

wherein $n$ is an integer from two to fourteen and $m$ is an integer from one to three and another polymerizable monovinylidene compound.

21. Copolymers of compounds of the formula $$CH_2=CHO(C_nH_{2n}O)_mCOCH=CHCH_3$$

wherein $n$ is an integer from two to fourteen and $m$ is an integer from one to three and another polymerizable monovinylidene compound.

References Cited in the file of this patent

UNITED STATES PATENTS

| Number | Name | Date |
|---|---|---|
| 2,350,325 | Coleman et al. | June 6, 1944 |
| 2,395,812 | Gudgeon et al. | Mar. 5, 1946 |
| 2,396,434 | Rehberg et al. | Mar. 12, 1946 |
| 2,462,400 | Hoover | Feb. 22, 1949 |
| 2,541,142 | Zief et al. | Feb. 13, 1951 |
| 2,582,911 | Neher et al. | Jan. 15, 1952 |

OTHER REFERENCES

Bauer et al.: S. N. 773,922, Abstract, published November 1, 1949, 628 O. G. 257.